United States Patent
Zhu (10) Patent No.: US 10,069,296 B2
(45) Date of Patent: Sep. 4, 2018

(54) PCU PPFC SURGE LIMITER (71) Applicant: Marotta Controls, Inc., Montville, NJ (US)

(72) Inventor: Haoran Zhu, Livingston, NJ (US)

(73) Assignee: Marotta Controls, Inc., Montville, NJ (US)

(*) Notice: Subject to any disclaimer, the term of this patent is extended or adjusted under 35 U.S.C. 154(b) by 543 days.

(21) Appl. No.: 14/173,112

(22) Filed: Feb. 5, 2014

(65) Prior Publication Data
US 2015/0222115 A1 Aug. 6, 2015

(51) Int. Cl.
*H02H 9/04* (2006.01)

(52) U.S. Cl.
CPC .................................. *H02H 9/04* (2013.01)

(58) Field of Classification Search
CPC ........... H02H 3/044; H02H 9/002; H02H 9/04
See application file for complete search history.

(56) References Cited

U.S. PATENT DOCUMENTS

| | | | | |
|---|---|---|---|---|
| 8,614,870 B2 * | 12/2013 | Kheraluwala | .......... | H02H 9/002 361/63 |
| 2004/0007876 A1 * | 1/2004 | Braun | .......... | F02D 29/06 290/1 A |
| 2006/0279885 A1 * | 12/2006 | Sung | .......... | H02H 9/042 361/42 |
| 2007/0121257 A1 * | 5/2007 | Maitra | .......... | H01H 9/542 361/2 |
| 2007/0127177 A1 * | 6/2007 | Benton | .......... | H02H 9/005 361/90 |
| 2009/0168278 A1 * | 7/2009 | Landry | .......... | H02H 9/041 361/56 |
| 2009/0296298 A1 * | 12/2009 | Divan | .......... | H02H 3/025 361/58 |
| 2009/0323243 A1 * | 12/2009 | Morrish | .......... | H02H 9/025 361/101 |
| 2010/0103574 A1 * | 4/2010 | Morrish | .......... | H02H 9/025 361/58 |
| 2010/0141035 A1 * | 6/2010 | Chen | .......... | H02M 7/53873 307/64 |
| 2010/0152912 A1 * | 6/2010 | Huang | .......... | G06F 1/266 700/295 |
| 2012/0319483 A1 * | 12/2012 | Scruggs | .......... | B60R 16/033 307/52 |
| 2013/0170311 A1 * | 7/2013 | Lai | .......... | H02J 7/345 365/228 |

* cited by examiner

*Primary Examiner* — Scott Bauer
(74) *Attorney, Agent, or Firm* — Lerner, David, Littenberg, Krumholz & Mentlik, LLP (57) ABSTRACT

The present disclosure is directed to a surge limiting circuit electrically coupleable between a power source and a downstream component. The surge limiting circuit may include a transistor configured to operate in each of a first mode that allows an electric current to flow through the transistor, a second mode that cuts off an electric current from flowing through the transistor, and a third mode that only partially allows an electric current to flow through the transistor while partially cutting off the electric current. The surge limiting circuit may further include a control circuit coupled to the transistor and configured to control operation of the transistor in response to an electrical voltage at the transistor's output. The control circuit may further be configured to repeatedly cycle between controlling operation of the transistor in the first mode and the second mode such that the transistor operates in the third mode.

22 Claims, 5 Drawing Sheets

PCU PPFC SURGE LIMITER

FIELD OF THE INVENTION

The present invention relates to surge limiting circuitry for power control in a system during surge conditions, as well as to systems including such circuitry, and to methods for controlling the operation of such circuitry in those systems.

BACKGROUND

Surge limiters are regularly employed in modern electronic apparatuses and systems, such as in computer servers, telecommunications, and high reliability redundant systems. A surge limiter is generally designed to protect electrical equipment from power surges, or voltage or current spikes. In some applications, an alternating current (AC) voltage platform that supplies voltage to equipment in unconditioned form and may have power surges and dropouts based on power demand, load switching, and mission profiles. therefore, a properly designed surge limiter avoids deleterious effects to equipment voltage during, for example, the insertion or removal of circuit card assemblies into or from powered equipment. Generally, in these systems, the voltage source is a low impedance direct current (DC) distribution system, and it is typically well regulated and conditioned.

For example, an electrical system having high-power equipment (e.g., motors, compressors, an aircraft launcher, etc.) can require a lot of energy to switch the equipment on and off. The on/off switching can create a sudden, brief demand for power, which upsets the steady voltage flow in the electrical system, thereby creating power surges that are severe enough to damage downstream electronic components. In some situations, damage to the components can occur immediately, provided that a high enough voltage is provided to the component, even over a brief span of time (e.g., a voltage spike). In other situations, a relatively lower voltage can cause similar damage to downstream components if sustained for a longer span of time. Either situation can be detrimental to the electrical system.

Generally, a limiter uses a transistor to protect downstream equipment from upstream power surges. The pass transistor operates in one of two modes. During a power surge, the transistor operates in a shut-off mode ("off" mode), in which the current received from the upstream components is stopped and the excess voltage is blocked to the downstream components. At other times, the transistor operates in a saturation mode ("on" mode), in which the current received from the upstream components is passed through the transistor to the downstream electronic components.

Because the transistor blocks the energy received when operating in the "off" mode, the downstream components stop receiving power until the transistor switches back to the "on" mode. In some situations, such as when experiencing a brief voltage spike, the downstream components may be capable of continuing to operate for the duration of the spike. However, in other situations, such as where the surge is sustained for a relatively longer period of time, the downstream components may not be capable of continuing operation until the transistor switches back to the "on" mode. This is unacceptable in certain applications, in which it is desired that the components continue to operate even during surge conditions.

For example, in a power conversion unit (PCU) that converts an unregulated alternating current (AC) platform power into a filtered direct current (DC) power, the incoming AC voltage is unregulated and may have transient events, such as power surges and/or dropouts (e.g., based on power demands, load switching, mission profiles, etc.). These transients can generate high voltage DC during power surge conditions, which in turn can damage downstream components. In order to maintain operation of the downstream components during such conditions, at least some of the current from the PCU must be passed through to the downstream components, even during surge conditions.

Therefore, there is a need for a surge limiter that permits one or more downstream components to continue operation even during power surge conditions.

BRIEF SUMMARY OF THE INVENTION

One aspect of the present disclosure provides for a surge limiting circuit electrically coupleable between a power source and a downstream component configured to operate on power from the power source. The surge limiting circuit may include a transistor configured to operate in each of a first, second and third mode. The first mode may allow an electric current from the power source to flow through the transistor. The second mode may cut off an electric current from the power source from flowing through the transistor. The third mode may allow only a portion of an electric current from the power source to flow through the transistor while a remaining portion of the electric current is cut off from flowing through the transistor.

The surge limiting circuit may further include a control circuit electrically coupled to the transistor, and configured to control an operation of the transistor in response to an electrical voltage at an output of the transistor. During a transient event, the control circuit may alternate between controlling operation of the transistor in the first mode and the second mode such that the transistor operates in the third mode. The control circuit may control an operation of the transistor based on whether the received electrical voltage exceeds a predetermined threshold level. The control circuit may control operation of the transistor such that an amount of voltage suitable for operating the downstream component is passed through the transistor.

In some aspects, the surge limiting circuit may further include a high voltage dissipation circuit configured to dissipate a portion of the energy from the electrical voltage provided from the power source. The high power dissipation circuit may include an active load circuit, configured such that a portion of the energy from the voltage provided from the power source is dissipated by the active load circuit and a remaining portion of the energy either passes through or is dissipated by the transistor. The high power dissipation circuit may further, or alternatively, include one or more transient voltage suppression circuits. The transient voltage suppression circuit(s) may be configured such that a portion of the energy from the voltage provided from the power source is dissipated by the one or more transient voltage suppression circuits. The surge limiting circuit may operate on a floating voltage.

A further aspect of the present disclosure provides for a method of limiting an electrical voltage. The method may involve monitoring, at a control circuit, an electrical voltage at an output terminal of a transistor. The method may further involve determining an operation of the transistor based on the monitored electrical voltage. That determination may be made between one of a first mode and a second mode of operation. The first mode may allow power from a power source to flow through the transistor, and the second mode may block or dissipate power from the power source at the transistor. The method may yet further involve setting the transistor to one of the first mode and the second mode based on the determination. The method may cyclically repeat such that the transistor operates in a third mode, allowing only a portion of the power from the power source to flow through the transistor and blocking or dissipating a remaining portion of the power at the transistor. The cyclical repetition may be at a frequency of about 450 Hz or faster.

In some aspects, the transistor may operate in the third mode during a power surge and in the first mode when there is no power surge.

Yet a further aspect of the disclosure is directed to a system including one or more electrical components, a power source configured to provide direct current power for operating the one or more electrical components, and a surge limiting circuit electrically coupled between the power source and said one or more electrical components. The surge limiting circuit may include a transistor configured to operate in each of a pass through and quasi-linear mode. The pass through mode may allow an electric current from the power source to flow through the transistor to the one or more electrical components. The quasi-linear mode may allow only part of an electric current from the power source to flow through the transistor to the one or more electrical components, and may cut off the remaining electric current from flowing through the transistor to the one or more electrical components. The surge limiting circuit may further include a control circuit electrically coupled to the transistor, and configured to control an operation of the transistor in response to an electrical voltage received from an output of the transistor. The control circuit may further modulate the transistor such that the transistor operates in the quasi-linear mode during a transient event.

In some aspects, the power source may include an alternating current power source and a converter circuit configured to convert the power from the power source into a direct current power. The system may also include a bulk energy storage capacitor configured to filter the power provided to the one or more electrical components. The system may also include a high voltage dissipation circuit coupled between an output of the power source and an input terminal of the transistor to dissipate a portion of the energy from an electrical voltage provided from the power source. In some aspects, the system may be one of a ground vehicle, watercraft, and aircraft.

BRIEF DESCRIPTION OF THE DRAWINGS

A more complete appreciation of the subject matter of the present disclosure and of the various advantages thereof can be realized by reference to the following detailed description in which reference is made to the accompanying drawings in which.

DETAILED DESCRIPTION

In describing certain aspects of the present disclosure, specific terminology will be used for the sake of clarity. However, the invention is not intended to be limited to any specific terms used herein, and it is to be understood that each specific term includes all technical equivalents, which operate in a similar manner to accomplish a similar purpose.

One object of the present disclosure is to provide a surge limiting circuit that is capable of protecting a downstream component from the damaging effects of a transient event (e.g., power surge) while providing necessary power to the downstream component to permit continued operation of the component. Another object of the present disclosure is provide a method of limiting a portion of power received at a surge limiting circuit during a transient event while passing the remaining power to a downstream component. Yet another object of the present disclosure is to provide a system that is capable of distributing high voltage power among one or more power limiting and/or clamping components (e.g., voltage limiters, current limiters, etc.) thereby protecting a downstream component from being damaged by the high voltage power.

The surge limiting circuit may include a transistor and a control circuit that controls an operation of the transistor. The controller may determine and set an appropriate mode of operation for the transistor based on an amount of voltage detected at an output of the transistor. For example, if the amount of voltage at the output of the transistor is at or below an appropriate amount for operating the downstream component (e.g., powering a downstream motor, etc.) or charging a downstream load, the controller may set the transistor to an "open" state in which power from a power source connected to an input of the transistor passes fully through the transistor to the downstream component/load. Conversely, if the amount of voltage is above the appropriate amount, the controller may set the transistor to a "closed" state in which power from the power source is cut off from passing through the transistor to the downstream component/load. Effectively, during a transient event, the controller operates as a negative feedback circuit for the transistor.

At a given time, if there is no transient event, the controller may set and maintain the transistor in the "open" state of operation. Conversely, during a transient event, in which maintaining the transistor in a "closed" state would not permit enough voltage to pass through the transistor, yet an "open" state would permit too much voltage to pass, the controller may cyclically alternate between setting operation of the transistor to "open" and "closed" settings. This cyclical control may be designed to alternate between "open" and "closed" settings so quickly that the transistor does not have time to either fully open or fully close. In such a case, some of the excess high-voltage energy is blocked or dissipated by the transistor, while the remaining energy at a relatively lower voltage is passed downstream. Effectively, the negative feedback control of the controller holds the transistor open enough that enough voltage passes through for downstream component(s) to continue operating, yet closed enough that excess voltage does not pass through.

Figure 1:
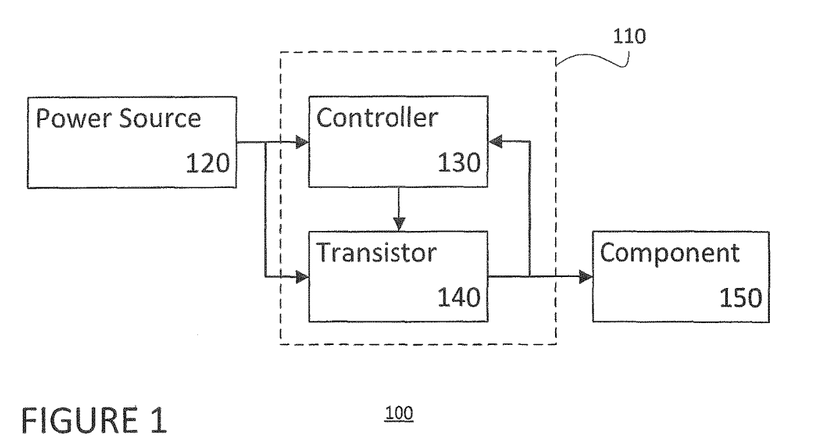
FIG. 1 is a functional block diagram of a surge limiting system in accordance with an embodiment of the present disclosure.

FIG. 1 is a functional block diagram of the basic components of a system 100 in accordance with the present disclosure. In some examples, the system 100 may be employed in a ground vehicle (e.g., automobile), watercraft, aircraft, or any other structure capable of operating on a floating voltage. The system 100 may include a power source 120, an electronic component 150, and a surge limiting circuit 110 electrically coupled between the power source and electronic component 150.

The power source 120 may provide low voltage direct current (DC) power to the downstream components of the system 100. In some examples, the power source 120 be a military standard 704B power supply and may provide an AC voltage of about 100 volts or more. The supplied voltage may be a three-phase AC voltage, which is passed through a rectifier circuit, filtered, and converted to direct current (DC).

The component 150 may be any component that is operated using power received from the power source 120. The component may be electronic (such as an electronic circuit) or mechanical (such as a motor). In the context of the present disclosure, the component may be any device for which it would be undesirable to receive an excessive voltage, either because the device could be damaged by the excessive voltage, or otherwise. Furthermore, in the context of the present disclosure, the component may be any device for which it would be desirable to continue operations even during a transient event or power surge. One such device may be a launcher in an aircraft.

The surge limiting circuit 110 of the system 100 may include a control circuit 130 and a transistor 140. Operation of the control circuit 130 and transistor 140 will be described in greater detail in the context of FIG. 2 below. As depicted by the arrows of FIG. 1, each of the control circuit and transistor may receive power from the power source 120. Power supplied to the control circuit 130 may be used to power the control circuit 130. Power supplied to the transistor 140 may be passed through the transistor 140 in order for the component 150 to continue operating.

FIG. 1 further depicts the control circuit 130 supplying a voltage to the transistor 140 and the transistor 140 supplying a voltage to the control circuit 130. As described in greater detail below, the voltage supplied by the control circuit may be used to control an operation or mode of the transistor, and the voltage supplied by the transistor may be used by the control circuit to determine a then-current voltage output of the transistor, and thereby dynamically determine an appropriate mode of operation for the surge limiting circuit 110.

Figure 2:
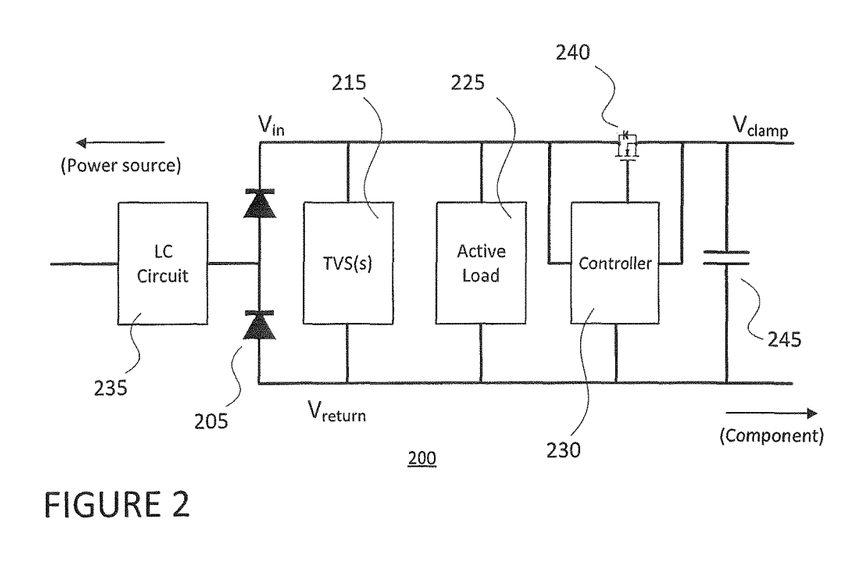
FIG. 2 is a circuit diagram of a portion of a surge limiting system, in accordance with an embodiment of the present disclosure.

FIG. 2 is a high level circuit and schematic diagram depicting an example layout of a portion 200 of the system 100 of FIG. 1. More particularly, FIG. 2 shows a surge limiting circuit as part of a PCU having a passive power factor correction (PPFC) circuit at the input section of the PCU. The lines in FIG. 2 depict the circuitry wiring of the PCU, i.e., the wiring between LC circuit 220, controller 230, and transistor 240, etc.

In the example of FIG. 2, LC circuit 235 is electrically coupled to the output of an AC power source, and is further electrically coupled to a floating voltage circuit loop having each of one or more transient voltage suppression (TVS) circuits 215, an active load 225, and a controller 230 in parallel. Diodes 205 may be used to guide the direction of the floating voltage, with $V_{in}$ corresponding to an incoming voltage and $V_{return}$ corresponding to the return (ground). The LC circuit 235 is further electrically coupled to an input of a transistor 240. As shown in FIG. 1, the transistor 240 and controller 230 are electrically coupled to one another such that an output of each provides an electrical signal to an input of the other. The output of the transistor is further electrically coupled to a bulk energy storage capacitor 245. In the example of FIG. 2, the capacitor should have sufficient storage capacity to drive one or more downstream components.

Power from the power supply (shown in FIG. 1) is absorbed by the LC circuit 220, which shapes the AC waveform. The LC circuit 220 further provides a high impedance at the input ($V_{in}$) of the transistor 240. The LC circuit 220 outputs a distortion-free waveform, and further includes an AC-DC converter to rectify and convert the waveform to high voltage DC. In the example of FIG. 2, the rectified DC voltage ($V_{clamp}$) is provided to a bulk energy storage capacitor 245, which collects and stores charge, and provides a steady DC voltage downstream to the component, thereby filtering the DC voltage.

In the example of FIG. 2, the one or more transient voltage suppression (TVS) circuits 215, the active load circuit 225, and the controller 230 and transistor 240, each functions to limit the incoming DC voltage ($V_{in}$) such that the output voltage ($V_{clamp}$) is maintained at an appropriate level. The TVS(s) 215 may function as the first line of protection against excessive DC voltage outputted by the PPFC, such as an excessive voltage caused by a transient event. The TVS(s) may include one or more serially connected unidirectional diodes. Voltage caused by a transient voltage event exceeding the cumulative breakdown voltage of the diodes may cause the breakdown of the TVS circuit, permitting some of the excess voltage to be shorted across the TVS circuit to the return line.

The active load 225 may function as a second line of protection against excessive voltage not shorted by the TVS(s) (e.g., excessive voltage less than the cumulative breakdown voltage of the TVS(s)). The active load 225 may also include one or more diodes (e.g., zener diodes) having a cumulative breakdown voltage that is less than the cumulative breakdown voltage of the TVS(s), thereby ensuring that only voltages in excess of the active load breakdown voltage are in fact limited. The active load 225 may further include an active device, such as a MOSFET transistor, that is activated by the excessive voltage. The active device may exhibit a relatively low resistance when a voltage in excess of the active load breakdown voltage activates the device (e.g., generates a relatively high base current at the base of the MOSFET), and a relatively high voltage when not activated (e.g., little or no current passes through the diodes, little or no current is applied to the gate of the MOSFET, etc.).

Together, the TVS circuit 215 and active load 225 may divert or dissipate at least some of the energy that comes from excess voltage outputted by the PPFC, such that only some of the energy from excess voltage is blocked by the transistor 240. The particular components of the TVS circuit 215 and active load 225 may be chosen to have relatively fast response times or order to ensure that the some of the energy from excess voltage is in fact passed through these components before being blocked by the transistor 240. Because the transistor 240 need not block all of the energy from excess voltage outputted by the PPFC, only one transistor 240 may be necessary for operation of the circuit 200 of FIG. 2, and that transistor may be relatively small, as compared to other transistors or groups of transistors normally selected to handle power surges, voltage spikes or other transient voltage events.

In addition to the TVS(s) and active load, the controller 230 and transistor 240 may provide a further line of defense against excess voltage. The controller 230 may be powered using the voltage that is not shorted out by the TVS(s) or active load, and as described in greater detail below in the description of FIG. 3, may be configured to control operation of the transistor such that enough voltage to power/charge the downstream component passes through the transistor, yet excess voltage (e.g., during a transient event) does not pass through. In those applications involving floating voltage, the controller should be configured to operate on a floating voltage topology.

Altogether, the TVS(s) 215, active load 225, and controller/transistor 240 collectively block or dissipate the energy from excess voltage generated during a transient event. The TVS(s) 215 clamps enough of the excess voltage to make the remaining voltage manageable for the active load 225 and controller/transistor 240. Likewise, the active load dissipates enough of the remaining excess energy to make whatever is left of the remaining excess voltage manageable for the controller/transistor 240. The controller/transistor 240 then dissipates whatever is left of the excess energy while managing the output voltage $V_{clamp}$, to an appropriate level for keeping the capacitor 245 charged and for keeping the downstream component(s) powered.

The controller may include a feedback circuit configured to detect a voltage at an input terminal of the controller that is electrically coupled to the output of the transistor 240. The controller may also be configured to provide a control signal to a control terminal (e.g., base terminal) of the transistor 240. The nature of the control signal may depend on whether the detected voltage is greater or less than a predetermined threshold voltage. In some examples, the controller may include a threshold voltage comparison circuit configured to compare the detected voltage with the predetermined threshold voltage. The threshold voltage may be set depending on several factors, such as the power dissipation capabilities of the transistor and the power requirements of the downstream component (e.g., component 150).

Figure 3:
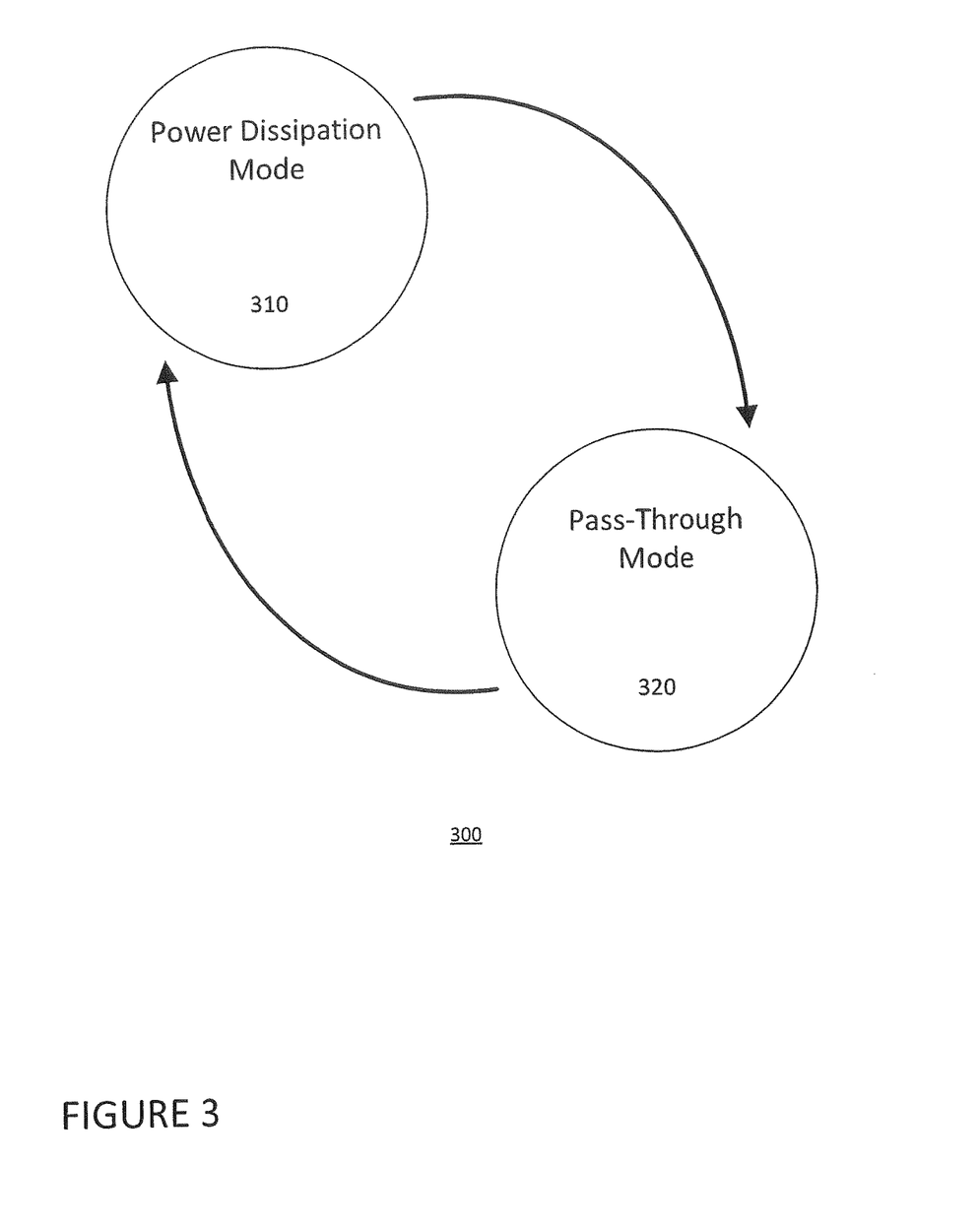
FIG. 3 is a state diagram depicting operation of a controller in accordance with an embodiment of the present disclosure.

FIG. 3 is a state diagram 300 depicting the operation of the controller 230 in controlling operation of transistor 240 during a transient event such as a power surge or voltage spike. At state 310, which may be set in response to a transient event, the controller 230 sets the transistor 240 to operate in a power dissipation (current blocking) mode. In power dissipation mode, the transistor gate is "closed" and current is not passed thorough to any downstream component. The energy from the remaining voltage is thus blocked by the transistor and does not reach any downstream component. As a result of this dissipation, the feedback voltage at the controller 230 drops and the controller adjusts the voltage applied to the gate of the transistor 240 in response to this drop. This adjustment causes the controller 230 to switch to state 320, in which the controller 230 sets the transistor 240 to operate in a pass-through mode. In the pass-through mode, the transistor gate is "open", meaning that current is permitted to pass through the transistor. Thus, the remaining voltage passes through to the downstream components, including to the feedback channel of the controller. As a result of the voltage passing through the transistor to the feedback channel during the transient event, the feedback voltage at the controller 230 rises and the controller again adjusts the voltage applied to the gate of the transistor 240 in response to this rise.

Under surge conditions, in which the DC voltage at the input side of the transistor is greater than the predetermined threshold voltage, the controller may be configured such that it transitions between states 310 and 320 faster than the transistor reacts to the voltage applied by the controller. Under such circumstances, cyclical transition of the controller between state 310 and state 320 may effectively result in a third mode of operation of the transistor, in which the channel of the transistor is not fully "opened" before the controller sets the transistor to power dissipation mode, and the transistor is not fully "closed" before the controller sets the transistor to pass-through mode. Thus, the channel of the transistor is modulated in a partially open, partially closed, state (hereinafter referred to as a "quasi-linear mode" of operation). In the quasi-linear mode, the transistor blocked some of the energy from the voltage received at the input, and passes the remaining voltage through to the downstream components and the feedback channel of the controller. Thus, cyclical transition of the controller states 310 and 320 (i.e., quasi-linear operation of the transistor) effectively clamps the voltage output of the transistor at $V_{clamp}$, thereby preventing damage to the downstream components due to excessive voltage, while still permitting some charge to pass through the transistor. This permits the downstream components to continue operating even during a relatively long transient event, while utilizing a relatively small power dissipation device as compared to a device that operates exclusively in power dissipation mode. What is meant by a "relatively small power dissipation device" may be either the quantity of transistors needed to dissipate the excess energy (e.g., a single transistor 240, as compared to a plurality of transistors) or the size of the transistor(s) (e.g., a small transistor as compared to a large transistor).

Figure 4:
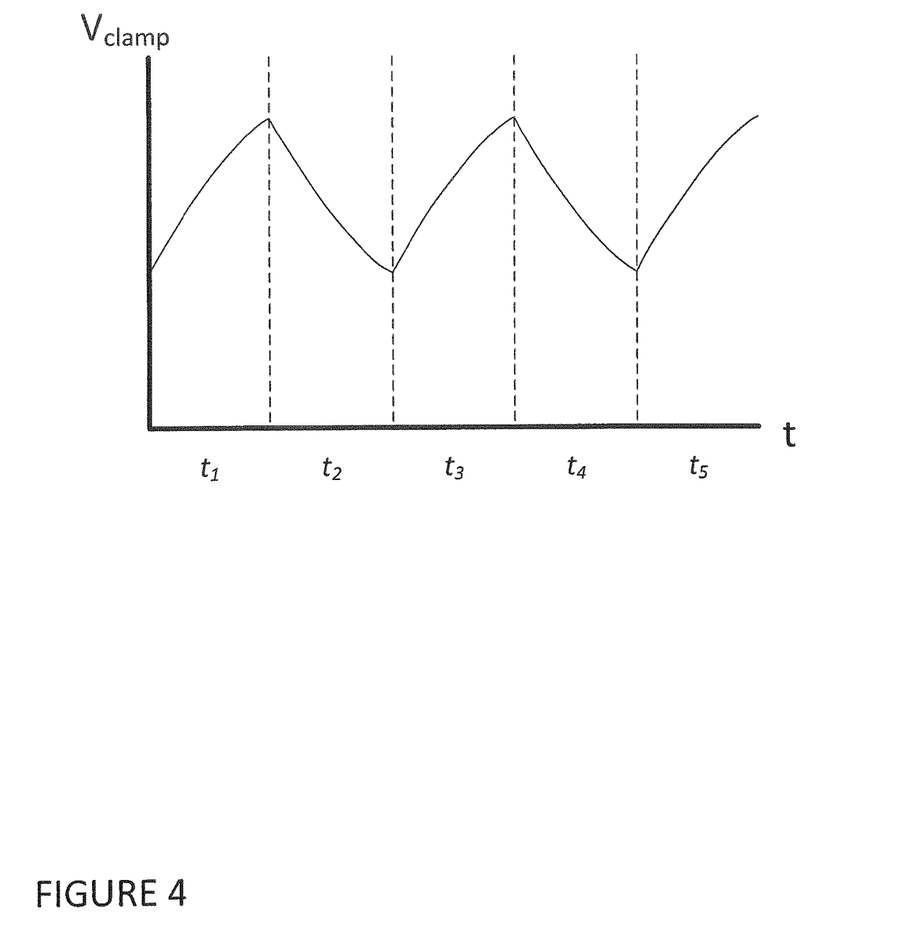
FIG. 4 is a graphical plotting of voltage against time in selected locations of a surge limiter in accordance with an embodiment of the present disclosure.

In order to achieve a quasi-linear mode of operation, the controller 230 may be configured to cycle the operation of the transistor fast enough for the transistor 240 to operate in the quasi linear mode. At such a rate, the effect of the oscillation is shown by the voltage plot of FIG. 4, which plots the voltage of the output of the transistor ($V_{clamp}$) over time. The vertical dashed lines in FIG. 4 represent the times at which operation of the transistor changes in response to signals received from the controller. Specifically, during times t1, t3, and t5, the controller 230 sets the transistor 240 to operate in the pass-through mode, and during times t2 and t4, the controller 230 sets transistor 240 to operate in the power dissipation mode. The range of the oscillating output voltage $V_{clamp}$ may be less than the voltage level at the input of the transistor during surge conditions, yet enough voltage to continue operation of the downstream components.

Figure 5:
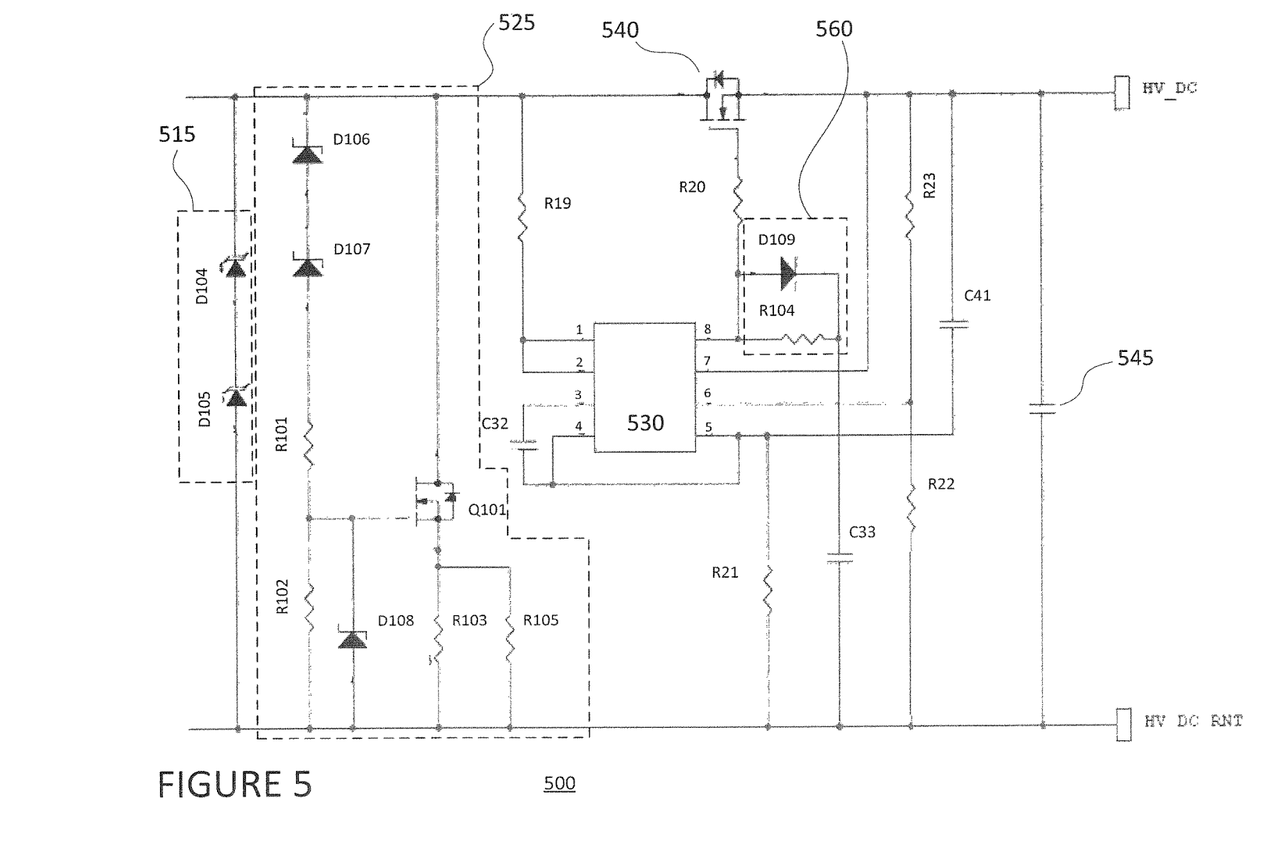
FIG. 5 is a schematic diagram of a circuit in accordance with an embodiment of the present disclosure.

FIG. 5 illustrates a schematic of a circuit 500 of one example embodiment of the surge limiter constructed in accordance with an aspect of the disclosure. In the example of FIG. 5, the illustrated surge limiter is designed to operate in a system for which the regular operating voltage is between about 300V and about 350V. Those having skill in the art will understand that precise values and ratings for components of the circuit 500 may vary from application to application depending on the precise specifications of a power source and/or downstream component connected to the circuit 500. As such, the value ranges provided herein are only meant as an example and not to limit the applicability of the present disclosure.

In the example of FIG. 5, the TVS circuit 515 includes a pair of serially connected diodes D104 and D105 with a cumulative breakdown voltage of between about 500V and about 600V. The active load 525 includes a pair of serially connected diodes D106 and D107 with a cumulative breakdown voltage of between about 275V and about 350V, a voltage divider including resistors R101 (between about 333 kΩ and 447 kΩ) and R102 (between about 75 kΩ and about 130 kΩ) and diode D108 at the gate of MOSFET Q101, and a pair of resistors R103 and R105 (each between about 75Ω and about 130Ω) in parallel at the source of MOSFET Q101.

In the example of FIG. 5, MOSFET Q101 is chosen to have a maximum drain-source voltage rating of at least about 500V or more.

Transistor 540 is chosen to have a maximum drain-source voltage of about 275V or less, preferably between about 225V and about 275V.

The controller 530 in the example of FIG. 5 is an LTC4366-2 high voltage limiter, configured to operate on a floating voltage topology. In order to handle the high voltages of the example of FIG. 5, resistor R22 has a resistance between about 750 kΩ and about 1.3 MΩ, and a wattage rating at between about 0.5 W and about 1 W. The threshold voltage of the controller may be configured to be between about 300V and about 350V (e.g., about 340V).

At the DC output of the limiter of the schematic 500 of FIG. 5 is a bulk capacitor 545. The minimum capacitance of the capacitor and the voltage at which charge is stored therein may vary based on the particular application or use of the limiter.

Additionally, the example of FIG. 5 includes an output short circuit protection 560 (diode D109 and resistor R104) in between the controller 530 and the transistor 540 to protect the controller 530 in the event of a sudden short circuit between HV_DC and HV_DC_RNT. In the example of FIG. 5, the resistor R104 has a resistance of between about 22 k and 27 k to limit the possible short circuit current into the controller 530. Ratings of the remaining components R19, R20, R21, R23, C32, C33, and C41, may be selected as suitable according to the controller's specifications.

Altogether, the above described components are configured such that the circuit 500 operates in the fashion described above in relation to FIGS. 2-4. The circuit 500 causes the output voltage HV_DC to oscillate between about 320V and about 340V, which is less than the voltage level at the input of the transistor during the transient event, yet enough voltage to continue operation of the downstream components. In the example of FIG. 4, the frequency of the oscillation is between about 450 Hz.

In other applications in which higher voltage is required, the above values may be adjusted appropriately, such that the breakdown voltages of the TVS and active load may be greater than 600V and 350V respectively, the threshold voltage of the controller may be greater than 350V, resistor R22 may have a wattage rating above 1 W, etc. Likewise, for applications requiring less voltage, breakdown voltages, threshold voltages and wattage ratings may be lower than the above specified ranges. The cycling frequency of the controller may also be adjusted, either higher or lower, depending on the configuration of the surge limiter, the electrical specifications of the power source or downstream components, etc.

Operations in accordance with operating the surge limiter (e.g., 230, 530) during a transient event will now be described. It should be understood that the following operations do not have to be performed in the precise order described below. Rather, various operations can be handled in a different order or simultaneously. It should also be understood that these operations do not have to be performed all at once. For instance, some operations may be performed separately from other operations. Moreover, operations may be added or omitted.

Figure 6:
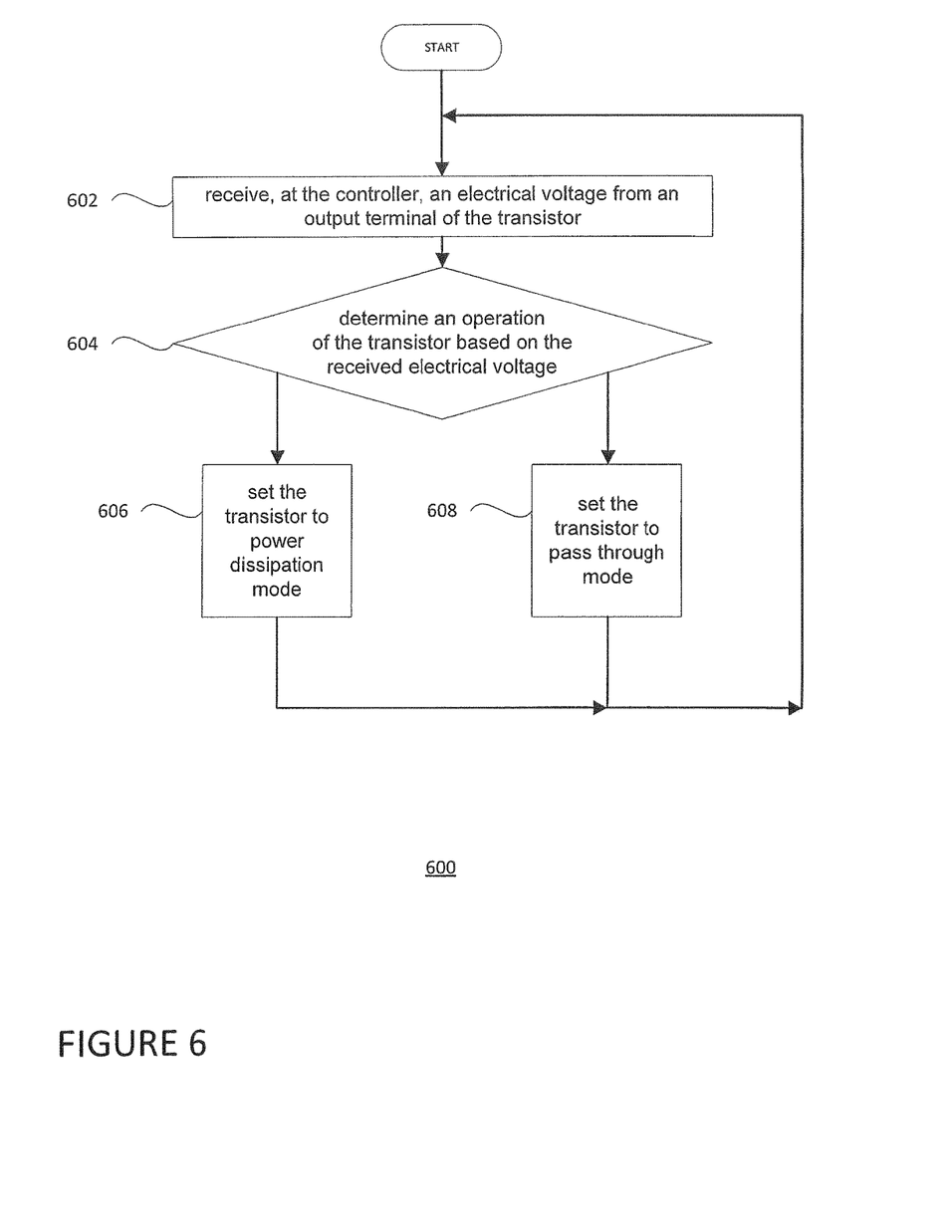
FIG. 6 is a flow diagram depicting operation of a surge limiter in accordance with an embodiment of the present disclosure.

FIG. 6 is a flow diagram depicting operations 600 for the above described surge limiter. In block 602, the control circuit monitors an electrical voltage at an output terminal of the transistor. In block 604, the control circuit determines an operation of the transistor based on the monitored electrical voltage in block 602. Such control may differ based on whether the monitored electrical voltage is greater than or less than a predetermined threshold voltage level. The predetermined threshold voltage level may correspond to a voltage level or current level suitable for operating downstream components. For example, if the received electrical voltage is greater than the predetermined threshold voltage, then the control circuit may determine to operate the transistor in a power dissipation mode in order to prevent excess voltage from passing through the transistor to any downstream component. Operations then continue in block 606, and the transistor is set to power dissipation mode. For further example, if the received electrical voltage in less than the predetermined threshold voltage, then the control circuit may determine to operate the transistor in a pass through mode in order to prevent excess voltage from passing through the transistor to any downstream load or component. Operations then continue in block 608, and the transistor is set to pass through mode. After setting the transistor in either block 606 or 608, operations are repeated, and the control circuit receives an electrical voltage from an output terminal of the previously set transistor.

During a transient event, operations 600 may cycle faster than the transistor is capable of being fully set to either a pass through or power dissipation mode. As such, repeatedly cycling through operations 600 may cause the transistor to operate in a quasi-linear mode of operation, dissipating some of the voltage received at the input, and passing the remaining voltage through to the downstream components and the feedback channel of the controller.

When the transient event ends, operations 600 may continue to repeatedly cycle. However, without an excessive voltage being passed through the transistor or monitored at the input of the control circuit, the control circuit may maintain the transistor in pass through mode without any need to set the transistor to power dissipation mode.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A surge limiting circuit electrically coupleable between a power source and a downstream component configured to operate on power from the power source, the surge limiting circuit comprising:
   a transistor configured to operate in each of a first, second and third transistor mode, said first transistor mode allowing an electric current from the power source to flow through the transistor, said second transistor mode cutting off an electric current from the power source from flowing through the transistor, and said third transistor mode allowing only a portion of an electric current from the power source to flow through the transistor while cutting off a remaining portion of the electric current from flowing through the transistor, wherein said third mode is a quasi-linear mode;
   a control circuit electrically coupled to the transistor, and configured to operate in either one of a first and second control mode in response to an electrical voltage at an output of the transistor, said first control mode instructing the transistor to operate in the first transistor mode, and said second control mode instructing the transistor to operate in the second transistor mode, wherein during a transient event the control circuit is configured to alternate between the first control mode and the second control mode, thereby modulating the transistor such that the transistor operates in the third, quasi-linear transistor mode.

2. The surge limiting circuit of claim 1, wherein the control circuit is configured to operate in the first or second control mode based on whether said received electrical voltage exceeds a predetermined threshold level.

3. The surge limiting circuit of claim 2, wherein said predetermined threshold level is about 300 volts or greater.

4. The surge limiting circuit of claim 1, wherein the control circuit controls operation of the transistor such that an amount of voltage suitable for operating the downstream component is passed through the transistor.

5. The surge limiting circuit of claim 4, wherein the control circuit is configured to control operation of the transistor such that about 300 volts or more passes through the transistor.

6. The surge limiting circuit of claim 1, wherein the surge limiting circuit is configured to operate on a floating voltage.

7. The surge limiting circuit of claim 1, further comprising a high voltage dissipation circuit configured to dissipate a portion of the energy from the electrical voltage provided from the power source.

8. The surge limiting circuit of claim 7, wherein the high power dissipation circuit comprises an active load circuit, wherein a portion of the energy from the voltage provided from the power source is dissipated by the active load circuit and a remaining portion of the energy either passes through or is blocked by the transistor.

9. The surge limiting circuit of claim 8, wherein the high power dissipation circuit further comprises one or more transient voltage suppression circuits, wherein a portion of the energy from the voltage provided from the power source is diverted by the one or more transient voltage suppression circuits.

10. The surge limiting circuit of claim 1, wherein during the transient event, the control circuit is configured to repeatedly cycle between the first control mode and the second control mode, thereby resulting in the transistor operating in the third transistor mode.

11. The surge limiting circuit of claim 1, further comprising one or more preliminary stage voltage limiting circuits configured to dissipate a portion of an electrical current provided from the power source, wherein the transistor is positioned downstream of the one or more preliminary stage voltage limiting circuits, whereby the one or more preliminary stage voltage limiting circuits are configured to reduce an electrical voltage at an input end of the transistor.

12. The surge limiting circuit of claim 11, wherein the transistor has a maximum drain-source voltage that is less than a transient voltage from the power source and greater than a breakdown voltage of the preliminary stage voltage limiting circuits.

13. A method of limiting an electrical voltage, the method comprising:
monitoring, at a control circuit, an electrical voltage at an output terminal of a transistor;
determining, at the control circuit, an instruction to be sent from the control circuit for controlling operation of the transistor based on the monitored electrical voltage, said determination being between one of a first instruction to operate said transistor in a first transistor mode allowing power from a power source to flow through the transistor, and a second instruction to operate said transistor in a second transistor mode cutting off electric current from the power source at the transistor; and
instructing the transistor to operate in one of the first transistor mode and the second transistor mode based on the determination,
wherein said control circuit cyclically repeats the method, thereby modulating the transistor such that the transistor operates in a third, quasi-linear transistor mode allowing only a portion of the power from the power source to flow through the transistor and dissipating a remaining portion of the power at the transistor during a transient event.

14. The method of claim 13, wherein said determining an instruction is based on whether the received electrical voltage exceeds a predetermined threshold level.

15. The method of claim 13, wherein said control circuit cyclically repeats the method at a frequency of about 450 Hz or faster.

16. The method of claim 13, wherein said control circuit cyclically repeats the method such that:
the transistor operates in the third transistor mode during a power surge; and
the transistor operates in the first mode when there is no power surge.

17. The method of claim 13, wherein the control circuit controls operation of the transistor such that an amount of voltage suitable for operating the downstream component is passed through the transistor.

18. A system comprising:
one or more electrical components;
a power source configured to provide direct current power for operating the one or more electrical components; and
a surge limiting circuit electrically coupled between the power source and said one or more electrical components, the surge limiting circuit comprising:
a transistor configured to operate in each of a first, second and third mode, said first mode allowing an electric current from the power source to flow through the transistor to the one or more electrical components, said second transistor mode cutting off an electric current from the power source from flowing through the transistor, said third mode allowing only part of an electric current from the power source to flow through the transistor to the one or more electrical components and cutting off the remaining electric current from flowing through the transistor to the one or more electrical components, wherein the third mode is a quasi-linear mode;
a control circuit electrically coupled to the transistor, and configured to control an operation of the transistor in response to an electrical voltage received from an output of the transistor, wherein the control circuit is configured to alternate between causing the transistor to operate in the first mode and causing the transistor to operate in the second mode during a transient event, thereby modulating the transistor such that the transistor operates in the third, quasi-linear mode.

19. The system of claim 18, wherein the power source comprises an alternating current power source and a converter circuit configured to convert the power from the power source into a direct current power.

20. The system of claim 18, wherein the system further comprises a bulk energy storage capacitor configured to filter the power provided to the one or more electrical components.

21. The system of claim 18, wherein the system further comprises a high voltage dissipation circuit coupled between an output of the power source and an input terminal of the transistor, the high voltage dissipation circuit configured to dissipate a portion of the energy from an electrical voltage provided from the power source.

22. The system of claim 18, wherein said system is one of a ground vehicle, watercraft, and aircraft.

* * * * *